United States Patent [19]
Ihara et al.

[11] Patent Number: 5,276,626
[45] Date of Patent: Jan. 4, 1994

[54] DIRECTION FINDING METHOD AND APPARATUS FOR CORRECTING MAGNETIZATION OF A VEHICLE

[75] Inventors: Yasuhiro Ihara, Neyagawa; Mitsuhiro Yamashita, Osaka, both of Japan

[73] Assignee: Matsushita Electric Industrial Co., Ltd., Kadoma, Japan

[21] Appl. No.: 685,392

[22] Filed: Apr. 11, 1991

[30] Foreign Application Priority Data
Apr. 12, 1990 [JP] Japan ................................ 2-97114

[51] Int. Cl.$^5$ ........................................ G06F 15/50
[52] U.S. Cl. .................................. 364/457; 364/449; 340/988
[58] Field of Search .............. 364/424.02, 443, 449, 364/453, 457, 454, 571.2; 340/995, 988

[56] References Cited

U.S. PATENT DOCUMENTS

| | | | |
|---|---|---|---|
| 4,454,583 | 6/1984 | Schneiderhan et al. | 364/449 |
| 4,727,492 | 2/1988 | Reeve et al. | 364/424.02 |
| 4,800,501 | 1/1989 | Kinsky | 364/453 |
| 4,807,462 | 2/1989 | Attar | 364/559 |
| 4,831,563 | 5/1989 | Ando et al. | 364/571.05 |
| 4,841,449 | 6/1989 | Suyama | 364/449 |
| 4,866,627 | 9/1989 | Suyama | 364/457 |
| 4,878,170 | 10/1989 | Zeevi | 364/449 |

FOREIGN PATENT DOCUMENTS

0214817 3/1987 European Pat. Off. .
2141551 12/1984 United Kingdom .
WO88/05155 7/1988 World Int. Prop. O. .

OTHER PUBLICATIONS

M. L. G. Thoone; "CARIN, a car information and navigation system": Philips Technical Review; vol. 43, No. 11/12, Dec. 1987.
Abstract of U.S. Pat. No. 4,862,398, patented Aug. 29, 1989.

*Primary Examiner*—Vincent N. Trans
*Attorney, Agent, or Firm*—Cushman, Darby & Cushman

[57] ABSTRACT

The direction finding apparatus provided in the vehicle (10) computes average data and variance data from output data of the terrestrial magnetism sensor (1) in straight moving, and determines reliability of the detected output data of the terrestrial magnetism sensor (1). The error due to the magnetization of the vehicle (10) is corrected by computing the examined data on each of plural center candidates and selecting a center candidate as a new center coordinate of the present output circle of the terrestrial magnetism. Then, the magnetization of the vehicle (10) is inferred from the new center coordinate, thereby to infer a precise terrestrial magnetism direction.

8 Claims, 13 Drawing Sheets

DIRECTION FINDING METHOD AND APPARATUS FOR CORRECTING MAGNETIZATION OF A VEHICLE

FIELD OF THE INVENTION AND RELATED ART STATEMENT

1. Field of the Invention

The present invention relates to a direction finding apparatus to be mounted on a vehicle, and more particularly to a direction finding apparatus which is capable of correcting an error of direction finding owing to a variation of the magnetization of the driving vehicle.

2. Description of the Related Art

As a direction finding apparatus, there is a direction finder for use in a navigation system of a vehicle. Such direction finding apparatus is used for finding a moving direction of the vehicle on the basis of terrestrial magnetism.

There have been many navigation systems having the direction finding apparatus. For instance, the Japanese published unexamined patent application No. Sho 58-190711 (Tokkai Sho 58-190711) discloses a direction finding apparatus having a magnetic direction sensor as terrestrial magnetism sensor.

Since the body of the vehicle is made mainly of iron plate which is easily magnetized, the terrestrial magnetism sensor mounted on the vehicle receives influence of the magnetization of the vehicle. It is therefore necessary to remove the influence of the magnetization of the vehicle when the terrestrial magnetism sensor is used for finding a moving direction of the vehicle. In other words, if the body of the vehicle is not magnetized at all, the moving direction of the vehicle is precisely detected by the terrestrial magnetism sensor which is mounted on the vehicle. In reality, however, the body of the vehicle is magnetized large or small, all the time. The terrestrial magnetism sensor on the vehicle detects a direction of the terrestrial magnetism which receives influence of the magnetization of the vehicle. As a result, the north direction detected by the terrestrial magnetism sensor on the vehicle is not necessary coincident with the geographical north. And the vehicle's direction, which is detected by the conventional direction finding apparatus, deviates very much from the actual direction of the vehicle.

FIG. 12 is a schematical perspective view of an example of a flux gate type a terrestrial magnetism sensor 1 which is widely used in the vehicle. The terrestrial magnetism sensor 1 generally comprises a pair of magnetism detecting coils 1A and 1B which are wound on a core 1C in a manner to be orthogonally aligned to each other. One magnetism detecting coil 1A is arranged in parallel to the front-rear direction of the vehicle, and an axis C1 passing two intersections of the magnetism detecting coils 1A and 1B is arranged to be perpendicular to the ground. The terrestrial magnetism sensor 1 detects the intensity of the horizontal component of the terrestrial magnetism. The intensity is detected by the magnetism detecting coils 1A and 1B which show the resolved intensity of a front-rear direction (straight moving direction of the vehicle) and a breath direction, respectively.

When it is assumed that the vehicle is not magnetized, two output voltages x and y of the magnetism detection coils 1A and 1B are shown on the X-Y coordinate as shown in FIG. 13. Referring to FIG. 13, a Y axis of coordinates represents the front-rear direction of the vehicle. An arrow R1 represents the direction of the terrestrial magnetism and points to the geographical north, and the length of the arrow R1 represents the intensity of the terrestrial magnetism. An angle $\theta 1$ represents the course of the vehicle with respect to the direction of the terrestrial magnetism. In this state that the vehicle is not magnetized, if the vehicle is turned at least one turn on the horizontal plane, the arrow R1 rotates retaining its root at the original point "0" on the X-Y coordinates, and the tip of the arrow R1 draws a circular locus $E_0$. The circular locus $E_0$ is named as an "output circle" since the output data of the terrestrial magnetism sensor 1 is coincident with the position of the circular locus $E_0$.

In an actual vehicle, the vehicle body made mainly of steel has been magnetized large or small, and hence the magnetization of the vehicle affects the detected output data of the terrestrial magnetism sensor 1. The influence is represented by the shifted output circle $E_1$ on the X-Y coordinates as shown in FIG. 14. Referring to FIG. 14, the center $O_1$ of the output circuit $E_1$ is shifted to the coordinates $(x_1, y_1)$. The interval or distance between the center of the shifted output circle $E_1$ and the origin point 0 represents intensity of the magnetization of the vehicle. In FIG. 14, the vehicle has the magnetism which has a value $x_1$ in X component and a value $y_1$ in Y component, and the direction thereof it pointed by an arrow $S_1$. Therefore, it is necessary to detect the precise position of the center of the present output circle, in order to detect the intensity and the direction of the magnetization of the vehicle. The precise vehicle's direction can be detected by using the direction finding apparatus which can detect the precise position of the output circle.

In the afore-mentioned direction finding apparatus for the navigation system (the Japanese published unexamined patent application No. Sho 58-190711), the navigation system has the vehicle direction sensor which comprises a magnetic direction sensor, a rotation angle sensor, and microcomputer for computing a center position of the output circle based on the stored data of the magnetic direction sensor. According to the prior art, while the vehicle is making a rotation of one turn on horizontal plane of the ground, the rotation angle sensor issues output signals every angle of 30°. Output data of the magnetic direction sensor are stored in the microcomputer when the output signal of the rotation angle sensor is issued. And, when the vehicle makes a rotation of one turn, namely 360°, the microcomputer computes respective averages of twelve sets of the data stored in the microcomputer. Then, a center position of the output circuit is inferred from the averages of the data. In other words, the microcomputer judges that the twelve set of the data are balanced on a circumference of the output circle, and it infers the center position of output circle from the plural averages.

In the conventional navigation system, however, when the vehicle passes through a place where terrestrial magnetism varies, the average of data which is detected at the same time deviates much from the circular locus of the output circle to be computed. Therefore, the center position of the computed output circle has swerved from the actual center position. When the vehicle passes through a place where a high intensity magnetic field is generated by a large current in a contact wire for an electric car or high voltage electric transmission lines, the state of the magnetization of the vehicle is varied by the magnetic field. The once-induced variation of the magnetization does not return to the original state even after passing this place. Usually several days are required for restoration of the magnetization to the original state as is familiar to one skilled in the art. Therefore, it is necessary to find the center position of the output circle during driving so as to correct the magnetization of the vehicle. However, the conventional navigation system necessitates turning round by 360 degrees in order to compute the center position of the output circle. Therefore, the conventional navigation system cannot revise the center position of the output circle during normal driving.

OBJECT AND SUMMARY OF THE INVENTION

An object of the present invention is to provide a direction finding apparatus which can correct an error due to the magnetization of the vehicle so as to find a high-precision vehicle's direction during ordinary driving.

In order to achieve the above-mentioned object, the direction finding apparatus of the present invention comprises:

terrestrial magnetism sensor means having two sensor elements arranged orthogonally to each other for detecting terrestrial magnetism;

turn rate sensor means for detecting a turning angle of moving direction the vehicle at turning;

wheel speed sensor means for detecting a mileage in straight moving;

straight moving detection means for detecting a straight moving state of the vehicle from output data of the turn rate sensor means and the wheel speed sensor means;

basic data memory means for storing output data of the terrestrial magnetism sensor means when the straight moving state of the vehicle is detected by the straight moving detection means;

data calculation means for calculating average data and variance data computed by the stored data of the basic data memory means and storing the average data and variance data;

reliability calculation means which determines a reliability data from the variance data and an order number of the output data of the terrestrial magnetism sensor means;

magnetization calculation means which infers intensity and direction of the magnetization of the vehicle from the average data, the variance data and the reliability;

magnetization memory means for storing the magnetization computed by the magnetization calculation means;

direction calculation means which infers a course of the vehicle from the output data of the terrestrial magnetism sensor means and the magnetization stored by the magnetization memory means; and data output means for outputting a direction of terrestrial magnetism computed by the direction calculation means.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter, preferred embodiments of the direction finding apparatus of the present invention are elucidated with reference to the accompanying drawings of FIGS. 1 to 10.

Figure 1:
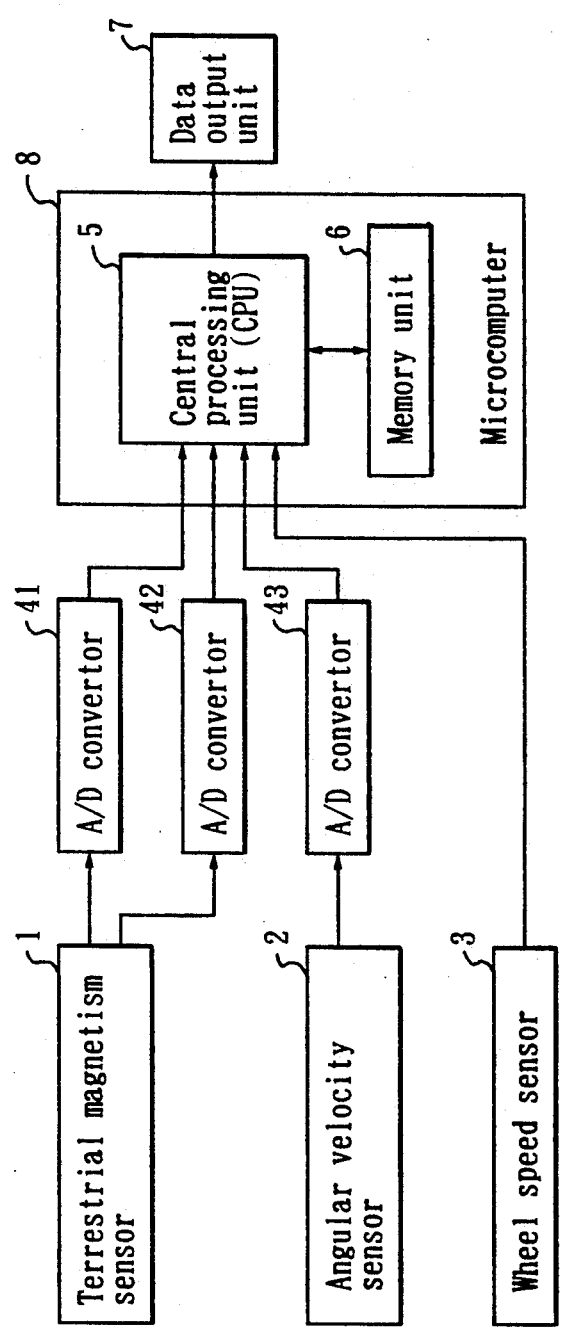
FIG. 1 is a block diagram of an embodiment of a direction finding apparatus of the present invention.
Figure 12:
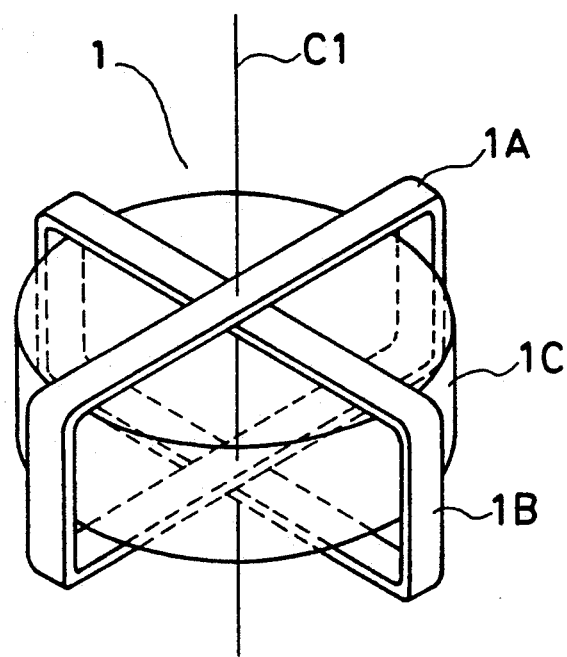
FIG. 12 is the perspective view of the conventional terrestrial magnetism sensor.

FIG. 1 is a block diagram of the embodiment of the direction finding apparatus in accordance with the present invention. In FIG. 1, a terrestrial magnetism sensor 1 which is mounted on a vehicle 10 comprises two magnetism detecting coils 1A and 1B, that is a first coil 1A and a second coil 1B configured as shown in FIG. 12. The first coil 1A and the second coil 1B of the terrestrial magnetism sensor 1 are aligned orthogonally to each other. The first coil 1A is positioned on a first vertical plane which is arranged in parallel with a front-rear direction of the vehicle 10 and is perpendicular to the ground. The second coil 1B of the terrestrial magnetism sensor 1 is provided on a second vertical plane which is arranged perpendicularly to said front-rear axis. The first vertical plane and the second vertical plane intersect each other at the vertical axis C1 of the terrestrial magnetism sensor 1 (FIG. 12).

The terrestrial magnetism sensor 1 detects two orthogonal components of horizontal component of the magnetic force of terrestrial magnetism by the first coil 1A and the second coil 1B, respectively. The signals of two directions which are output from the terrestrial magnetism sensor 1 are applied to A/D converters 41 and 42, and are converted to digital signals. These digital signals are applied to a CPU (central processing unit)

5 of a microcomputer 8 which performs arithmetic operations for the navigation system.

A rotation angle sensor, such as an angular velocity sensor 2 which is disposed in the vehicle 10 detects an angular velocity while the vehicle 10 is turning. The output signal of the angular velocity sensor 2 is applied to the CPU 5 through a A/D converter 43.

A wheel speed sensor 3, which is disposed adjacent a wheel of the vehicle 10, produces a pulse when the wheel rotates by a predetermined angle. The moving interval of the vehicle 10, that is mileage, is calculated by multiplying the output pulse by a constant rate in the CPU 5 of the microcomputer 8.

The microcomputer 8 which provides a memory unit 6 performs the below-mentioned correction process by the output data from the terrestrial magnetism sensor 1, the angular velocity sensor 2, and the wheel speed sensor 3. The results of the correction process and the amended direction of the terrestrial magnetism, etc. are displayed by a data output unit 7, such as CRT.

Figure 2:
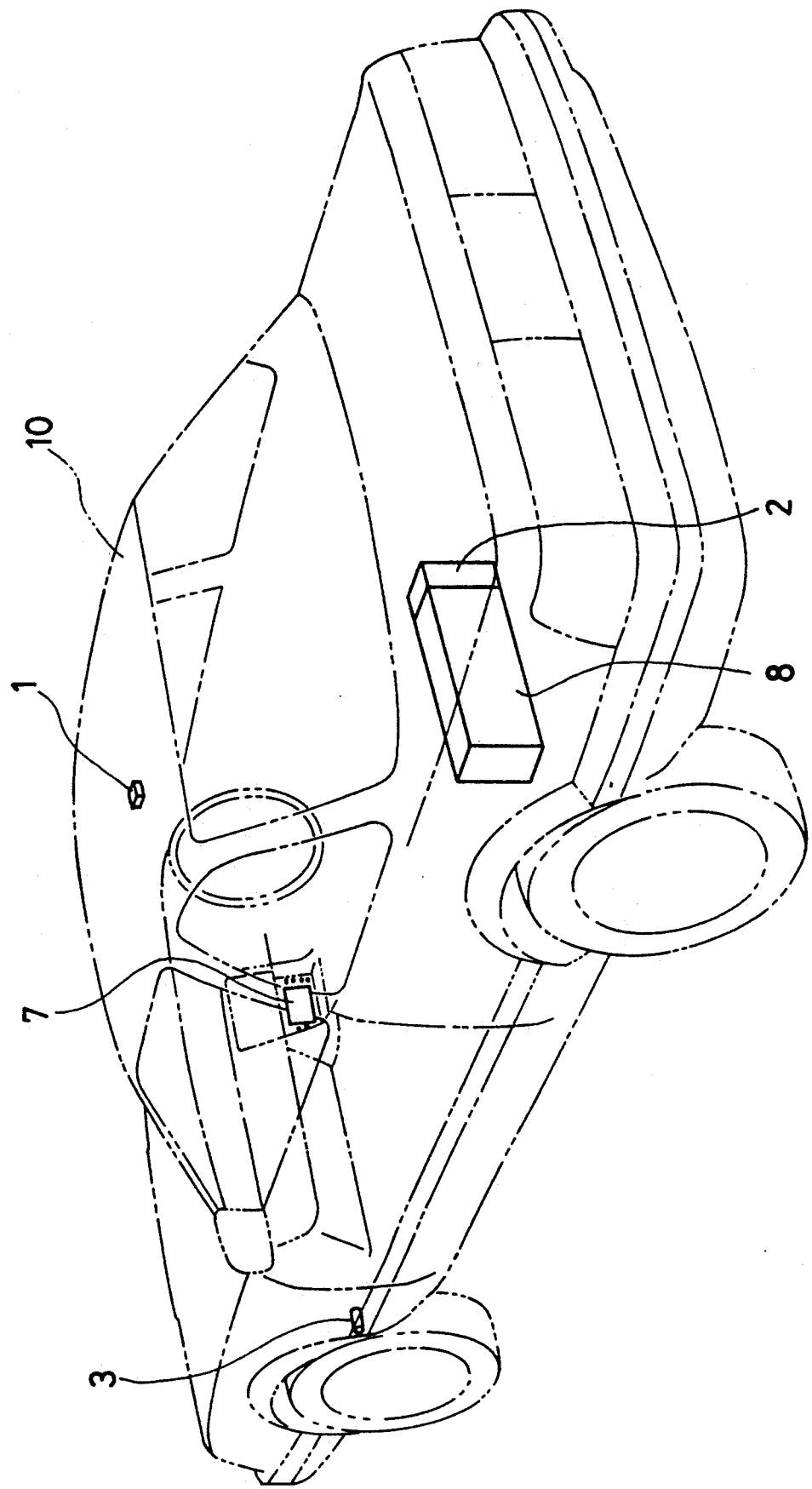
FIG. 2 is a perspective view showing principal parts of the direction finding apparatus shown in FIG. 1.

FIG. 2 is a perspective view showing a principal part of the direction finding apparatus which is disposed in the vehicle 10 shown with alternate long and short dash line. As shown in FIG. 2, the terrestrial magnetism sensor 1 is disposed at the substantially central part of the vehicle roof. The microcomputer 8 and the angular velocity sensor 2 are disposed in an appropriate space, such as under the back seat or in the trunk, and the data output unit 7 is disposed in a front grill.

The sequence for processing the output data from the terrestrial magnetism sensor 1, the angular velocity sensor 2, and the wheel speed sensor 3 is hereinafter described with reference to the flow chart of FIG. 3.

Figure 3:
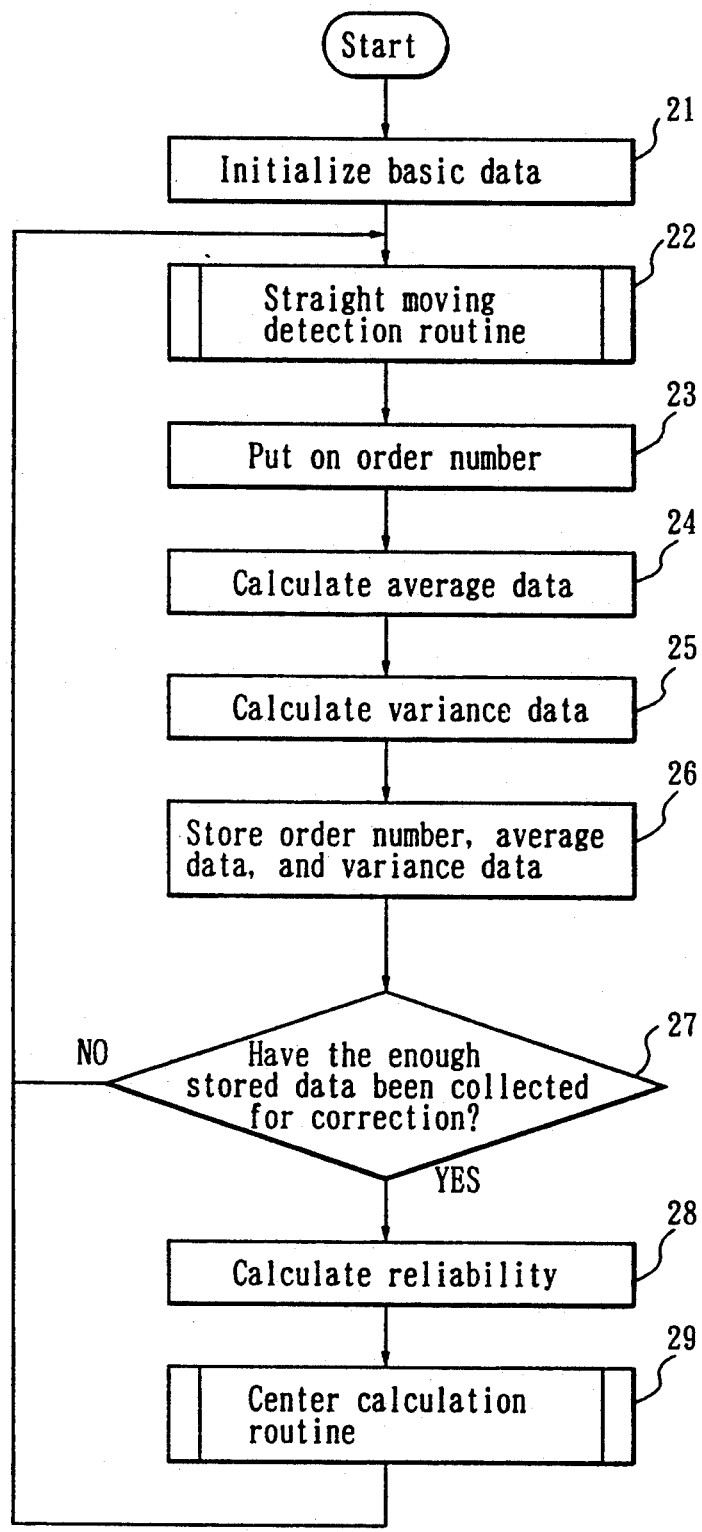
FIG. 3 is a flow chart showing a correction process for a magnetization of a vehicle in the embodiment shown in FIG. 1.
Figure 4:
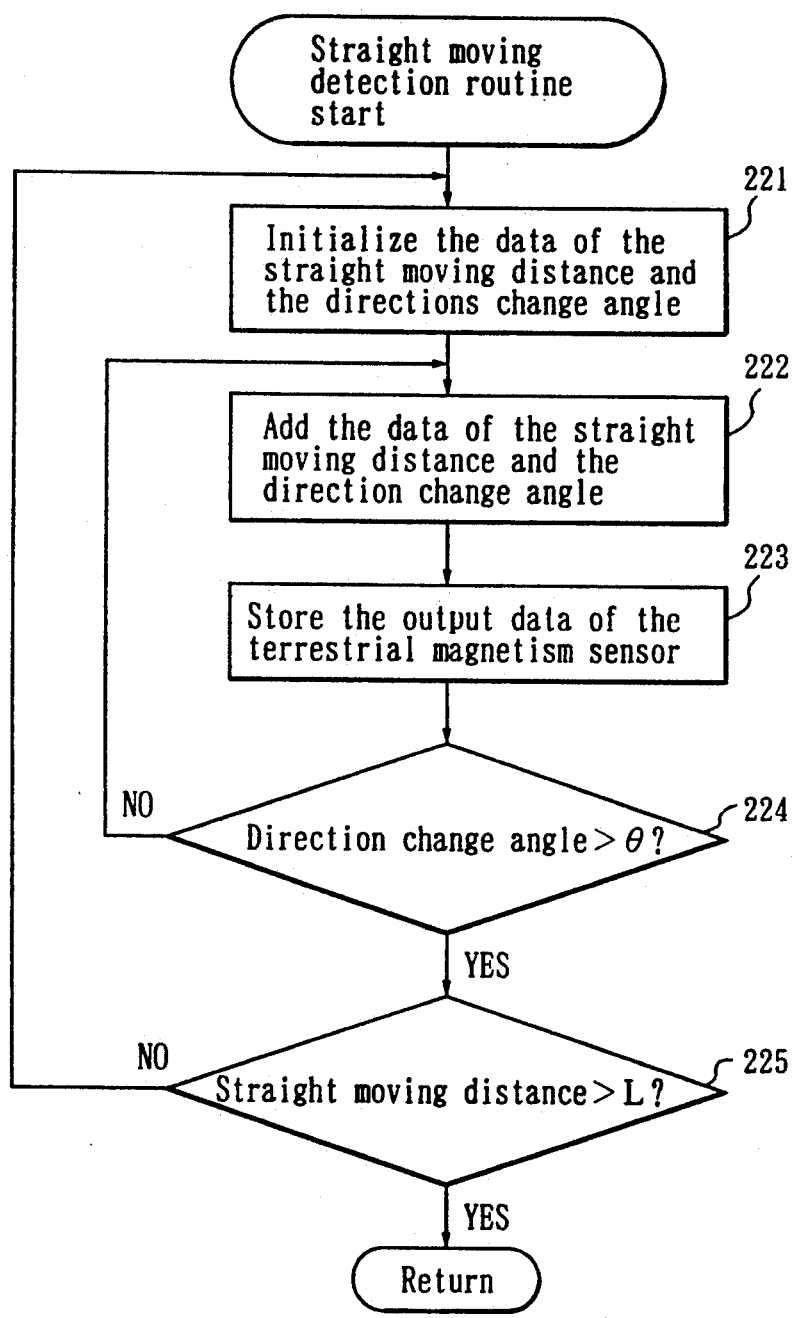
FIG. 4 is a flow chart showing a straight moving data memory routine in the flow chart shown in FIG. 3.

FIG. 3 is a flow chart showing the basic correction process of the embodiment of the direction finding apparatus in accordance with the present invention. In step 21 which is the first step to be executed by the CPU 5, an order number of the detected data is initialized to "0". Then, in step 22, the straight moving state of the vehicle 10 is detected, and the output data of the terrestrial magnetism sensor 1 in the straight moving state are stored in the memory unit 6 of the microcomputer 8. FIG. 4 is a flow chart showing the straight moving detection routine which is performed in the step 22 of FIG. 3.

A technology to improve accuracy or precision of output data from the terrestrial magnetism sensor 1 is very important for executing the correction process to be performed by using the output data having uneven precision. In the principle, when the vehicle 10 is moving in the same direction, the terrestrial magnetism sensor 1 should always produce the same output data. As a matter of fact, however, the output data from the terrestrial magnetism sensor 1 have scatters due to influence of the magnetic field which is produced by the magnetized iron-structures etc. surrounding the vehicle. Since the terrestrial magnetism sensor 1 is configured to receive a very week magnetic force of the terrestrial magnetism, the output data from the terrestrial magnetism sensor 1 are considerably influenced by the above-mentioned magnetic field of the magnetized iron structure.

The terrestrial magnetism sensor 1 during the while the vehicle 10 is stopping should produce the output data having even value. However, the output data from the terrestrial magnetism sensor 1 does not show high-precision terrestrial magnetism direction, because the terrestrial magnetism sensor 1 is subjected to the terrestrial magnetism containing a disturbance which depends on the area or position.

In the direction finding apparatus of the present invention, while the vehicle 10 is moving in a straight direction, that is the direction of the moving vehicle 10 is a constant, the direction finding apparatus for the navigation system detects and stores many kinds of output data from the terrestrial magnetism sensor 1. The direction finding apparatus performs a statistical analysis of the output data in order to obtain the high-precise terrestrial magnetism directions. Therefore, in step 22, the direction finding apparatus detects the straight moving state by processing the straight moving detection routine shown in FIG. 4.

In the straight moving detection routine of FIG. 3, one data which denotes a distance during straight moving, and the other data which denotes a direction change angle during turning are utilized for detecting the straight moving state. The distance during straight moving is detected by the wheel speed sensor 3, and the direction change angle during turning is detected by the angular velocity sensor 2.

In step 221 of the straight moving detection routine shown in FIG. 4, the data of the straight moving distance and the direction change angle are initialized.

In step 222, the data of the straight moving distance at every predetermined times, that is, mileages at every constant time during the straight moving, are added to the preceding data in succession during the straight moving of the vehicle 10. And, the other data of the direction change angle at every predetermined times, that is, an angle with respect to the direction of terrestrial magnetism at every constant times, are added to the preceding data thereof in succession during turning.

In step 223, the output data from the terrestrial magnetism sensor 1 are stored in the memory unit 6 at every predetermined times together with the data of the straight moving distance and the direction change angle. The stored output data of the terrestrial magnetism sensor 1 is utilized in the before-mentioned statistical analysis process in a center calculation routine.

In step 224, it is judged whether the direction change angle is equal to or larger than a predetermined angle $\theta$ (e.g. 5°). When the direction change angle is smaller than 5°, the CPU 5 judges the straight moving state continues, and the sequence thereafter returns to step 222. On the contrary, when the direction change angle is larger than 5°, the CPU 5 judges that the straight moving state has been finished, and the sequence thereafter goes to step 225.

In step 225, it is judged whether the straight moving distance is equal to or larger than a predetermined distance L, such as 30 m. When the straight moving distance is larger than 30 m, the CPU 5 judges that the vehicle 10 is in the straight moving state, and the straight moving detection routine (step 22) is finished. When the straight moving distance is 30 m or smaller, it is judged that the vehicle 10 is not in straight moving state, and the sequence thereafter returns to step 221.

In the above-mentioned straight moving detection routine (step 22), the data of the terrestrial magnetism during straight driving are stored in the memory unit 6, and the sequence thereafter goes to step 23 shown in FIG. 3.

Since, the vehicle 10 is subjected to many kinds of the afore-mentioned magnetic fields on the road, the magnetization of the vehicle 10 during moving always varies by receiving the influence of the magnetic fields. For example, when the vehicle 10 crosses a railroad using D.C. electrical system, the vehicle 10 will be magnetized by a magnetic field produced by D.C. flowing through the rail and cables. Thus the intensity and direction of the magnetization of the vehicle 10 are considerably changed. The once-induced variation of the magnetization of the vehicle 10 does not return to the original state even after passing away the place where the high intensity magnetic field exists. Several days are necessary for restoration to the original state with respect to the magnetization. Therefore, in case that the intensity and direction of the present magnetization is computed, the newer the data computed are, the higher the reliability of the computed intensity and direction are. Therefore, order number, which designates the old or the new data, is put on each detected data for judging the reliability of the data in the embodiment.

In step 23 of FIG. 3, the data, which is detected in the straight moving detection routine (step 22), is put on the above-mentioned order number. The order number of the data is utilized as a flag of the below-mentioned memory data. A modified embodiment may be such that time data of a clock in CPU is utilized instead of the above-mentioned order number.

In step 24 and step 25, an average data and a variance data are computed by the stored output data of the terrestrial magnetism sensor 1 as flags of the memory data, respectively. The memory data is composed of the average data, the variance data, the order number, and reliability data as mentioned below. When the n sets of the output data are stored in the memory unit 6, the average data x in X component, the average data y in Y component, and the variance data $\sigma$ are given by the following equations, $$x = \left( \sum_{i=1}^{n} xi/n \right), \quad (1)$$

$$y = \left( \sum_{i=1}^{n} yi/n \right), \text{ and} \quad (2)$$

$$\sigma^2 = \left( \frac{\sum_{i=1}^{n} (xi - x)^2 + \sum_{i=1}^{n} (yi - y)^2}{n} \right). \quad (3)$$

In step 26, the average data x, y and the variance data $\sigma$ which are computed in step 24 and step 25 are stored with the order number in the memory unit 6. These stored data should denote different positions on a circular locus of the output circle in order to correct errors due to localized magnetic effects or vehicle's body magnetization.

In step 27, it is judged whether the necessary data for processing the correction are obtained (stored) or not yet.

Figure 5:
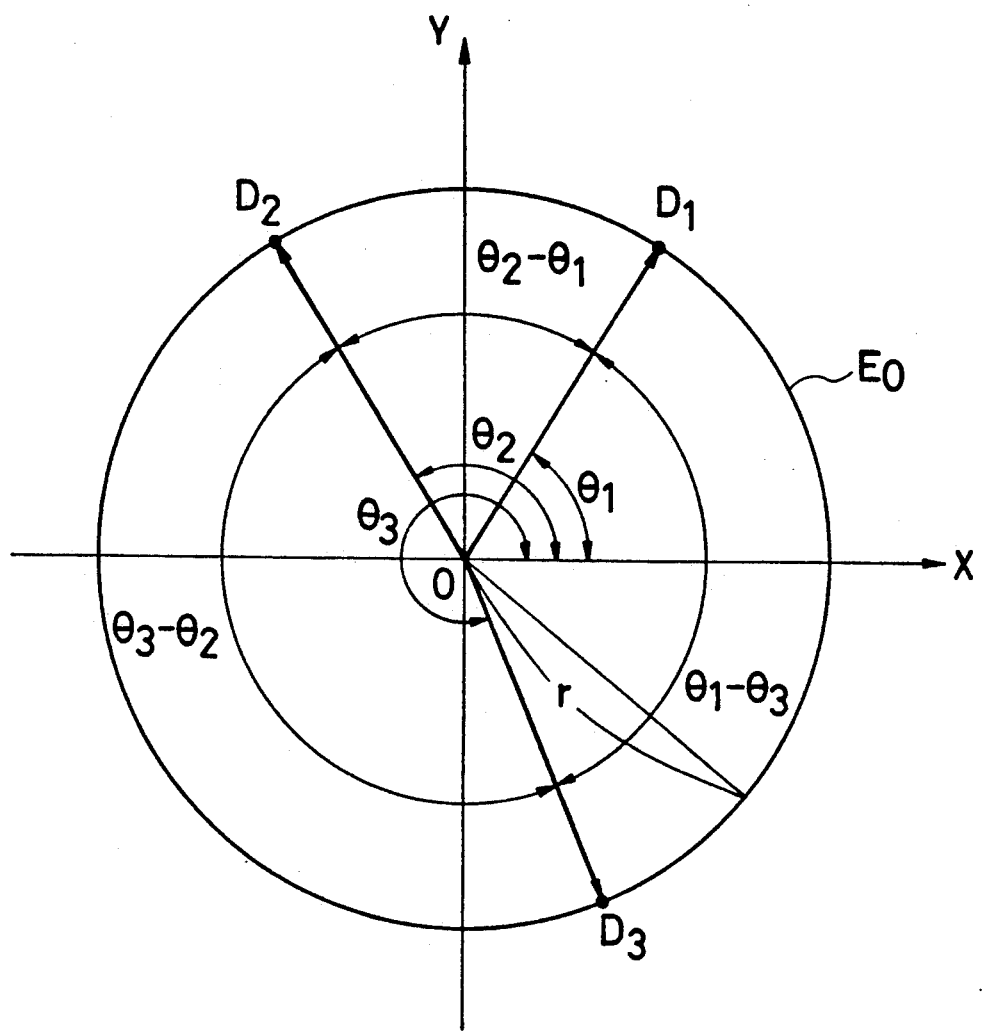
FIG. 5 is a diagram of assistance in explaining of the correction shown in FIG. 4, FIG. 6 and FIG. 7 are a graphs for finding a reliability of data which is utilized in the embodiment.
Figure 13:
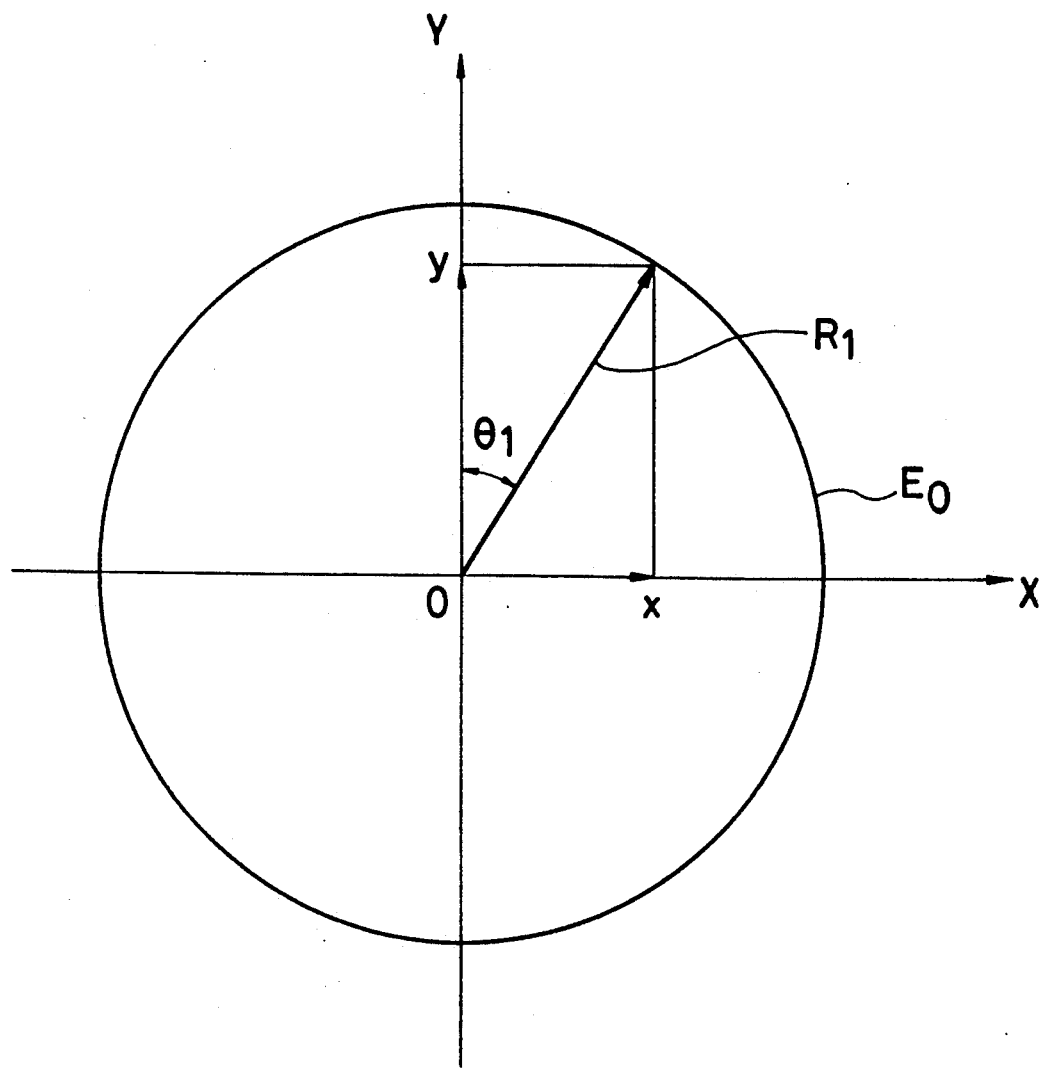
FIG. 13 is the graph of the output circle of the terrestrial magnetic sensor.
Figure 14:
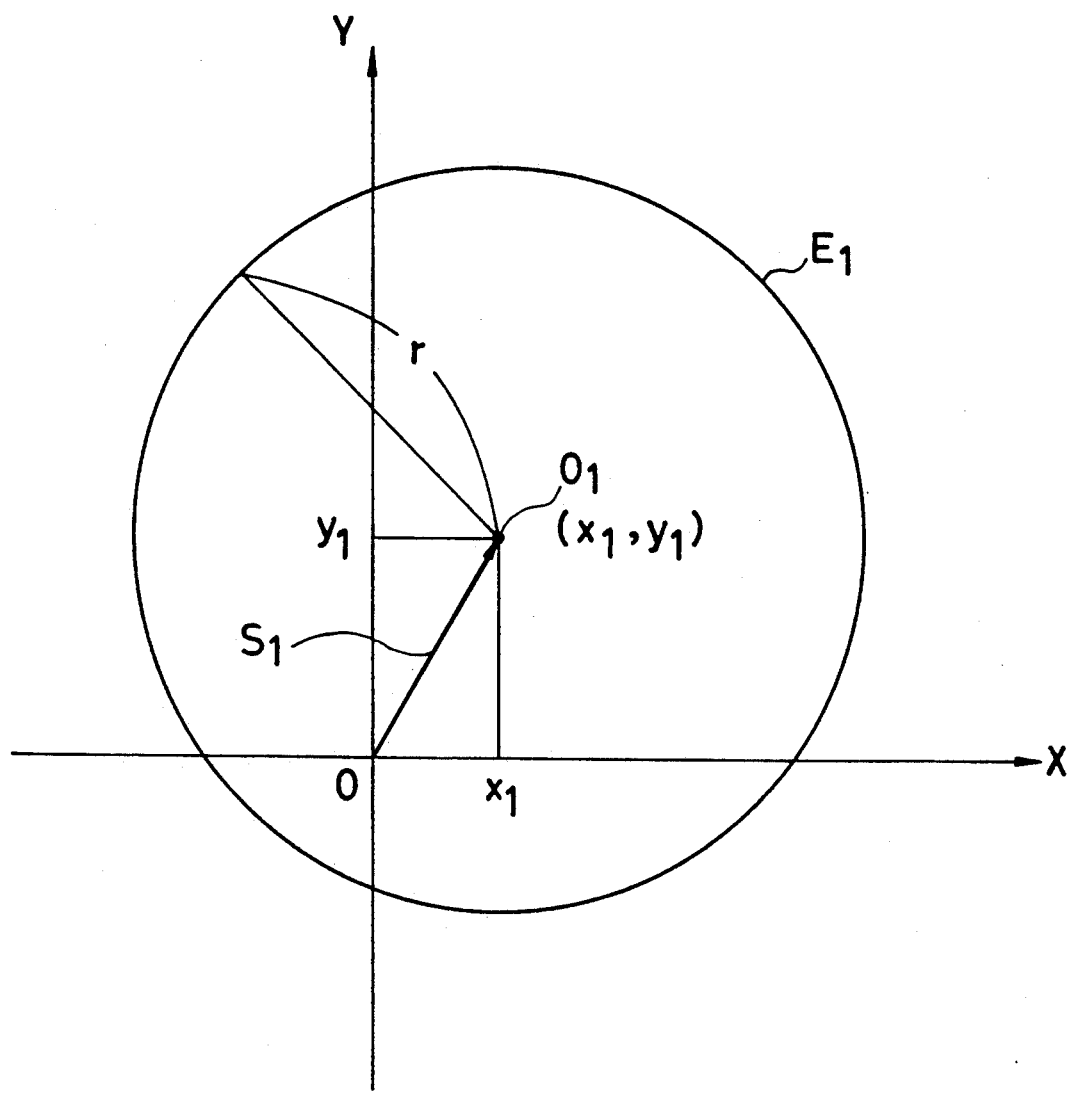
FIG. 14 is the graph of the output circle having the shifted center thereof in the prior art.

Hereafter, the judgement in step 27 is elucidated with reference to the accompanying drawing of FIG. 5. FIG. 5 is a diagram showing the circular locus $E_0$ to be described by the output data of the terrestrial magnetism sensor 1 in the same state as that shown in FIG. 13. The terrestrial magnetism sensor 1 which is mounted on the vehicle 10 detects intensity and direction of the horizontal component of the terrestrial magnetism. Assuming that the vehicle 10 is not magnetized, plural vectors $D_1$, $D_2$, $D_3$ - - - which are detected by the terrestrial magnetism sensor 1 are shown on the X-Y coordinates as shown in FIG. 5. These vectors $D_1$, $D_2$, $D_3$ - - - represent the detected directions of the terrestrial magnetism, and point to the "magnetism north" when the vehicle 10 is in the respective straight moving states. And, the lengths of the bearing vectors $D_1$, $D_2$, $D_3$ - - -represent the intensities of the terrestrial magnetisms. Angles $\theta_1$, $\theta_2$, $\theta_3$ represent the angle of the bearing vectors $D_1$, $D_2$, $D_3$ to the X axis of the coordinates, respectively.

In FIG. 5, when all of the values (absolute values) of differences of angles $|\theta_1-\theta_2|$, $|\theta_2-\theta_3|$, $|\theta_3-\theta_1|$ of the vectors $D_1$, $D_2$, $D_3$ are equal to or larger than a predetermined angle (e.g. 60°), it is judged that the memory data are obtained at every disposed position on circular locus $E_0$ of the output circle. When at least three data in all of the hitherto-detected memory data satisfy the above-mentioned condition, the correction is performed in step 28 and step 29.

Figure 6:
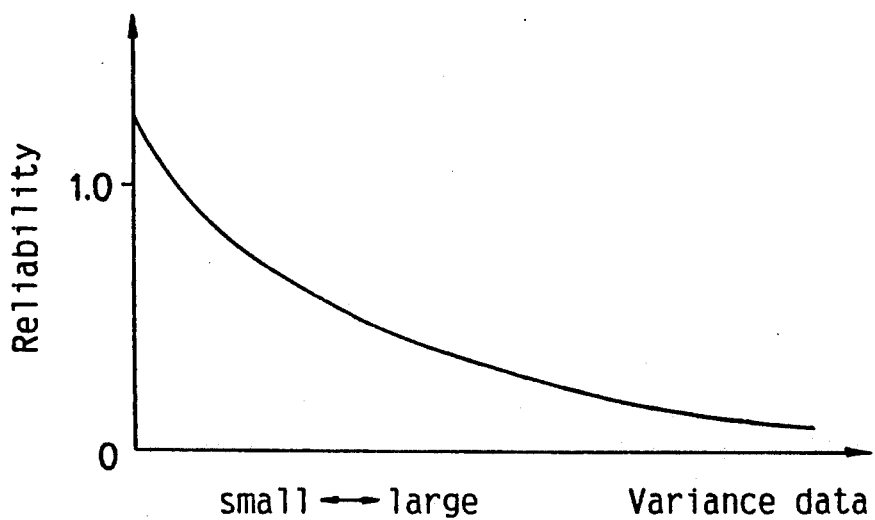
Figure 7:

In step 28, a reliability of the memory data is decided by the order number and the variance data $\sigma$ which are stored in the memory unit 6 in the above-mentioned step 26. FIG. 6 is a diagram showing a typical reliability line of the variance data $\sigma$ in the memory data. FIG. 7 is a diagram showing a typical reliability line of the order number in the memory data. Each reliability of the variance data $\sigma$ and the order number is decided by using these reliability lines shown in FIG. 6 and FIG. 7.

As shown in FIG. 6, the more the variance data $\sigma$ is, the lower a reliability of the average data is. The variance data $\sigma$ indirectly denotes a turbulence of the terrestrial magnetism. For example, when the vehicle 10 is moving on a high-level (elevated) road where the terrestrial magnetism is generally disturbed, the variance data $\sigma$ of the memory data is 2-5 times as large as the general data obtained during driving on an ordinary road. The reliability line shown in FIG. 6 is found preferable through many experiments of ours. It is considered that the variance data $\sigma$ denotes a degree of the disturbed terrestrial magnetism.

As shown in FIG. 7, the later (newer) the order number of the memory data is, the higher the reliability is. Since the magnetization of the vehicle 10 varies every moment during the driving, the later (newer) memory data is more reliable than the preceding data.

The final (latest) reliability data Rn is computed by multiplying the reliability of the variance data $\sigma$ and the reliability of the order number together. In step 28 shown in FIG. 3, the final reliability data Rn, which is a data in the memory data, is stored in the memory unit 6 together with the average data $\bar{x}$, $\bar{y}$, the variance data $\sigma$, and the order number. Then, the sequence thereafter goes to a center calculation routine in step 29.

In step 29, coordinate of the center of the shifted output circle is computed by utilizing the above-mentioned memory data.

Figure 8:
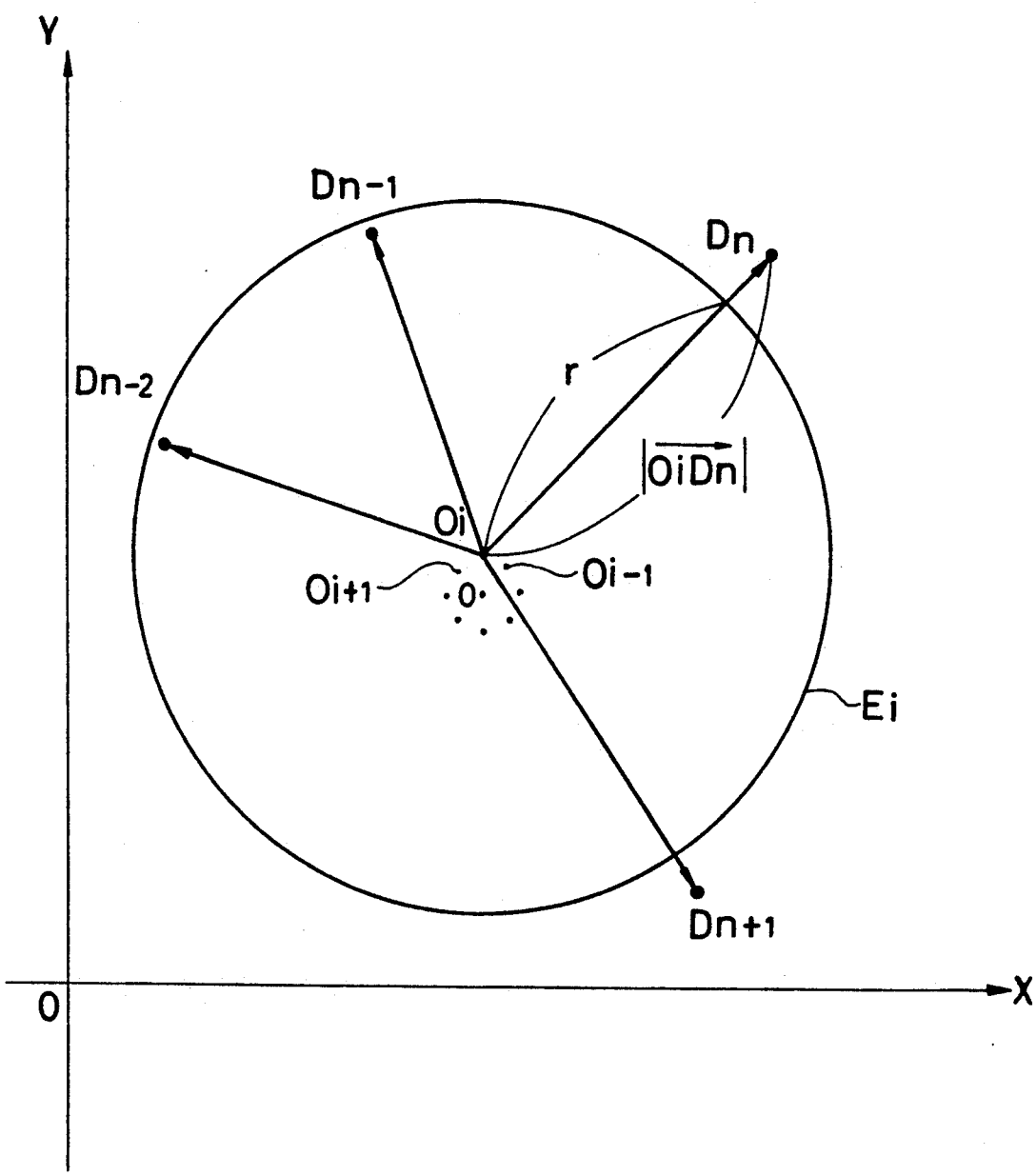
FIG. 8 is a graph of the output circle for assistance in explaining of an examined data which is utilized in the embodiment.
Figure 9:
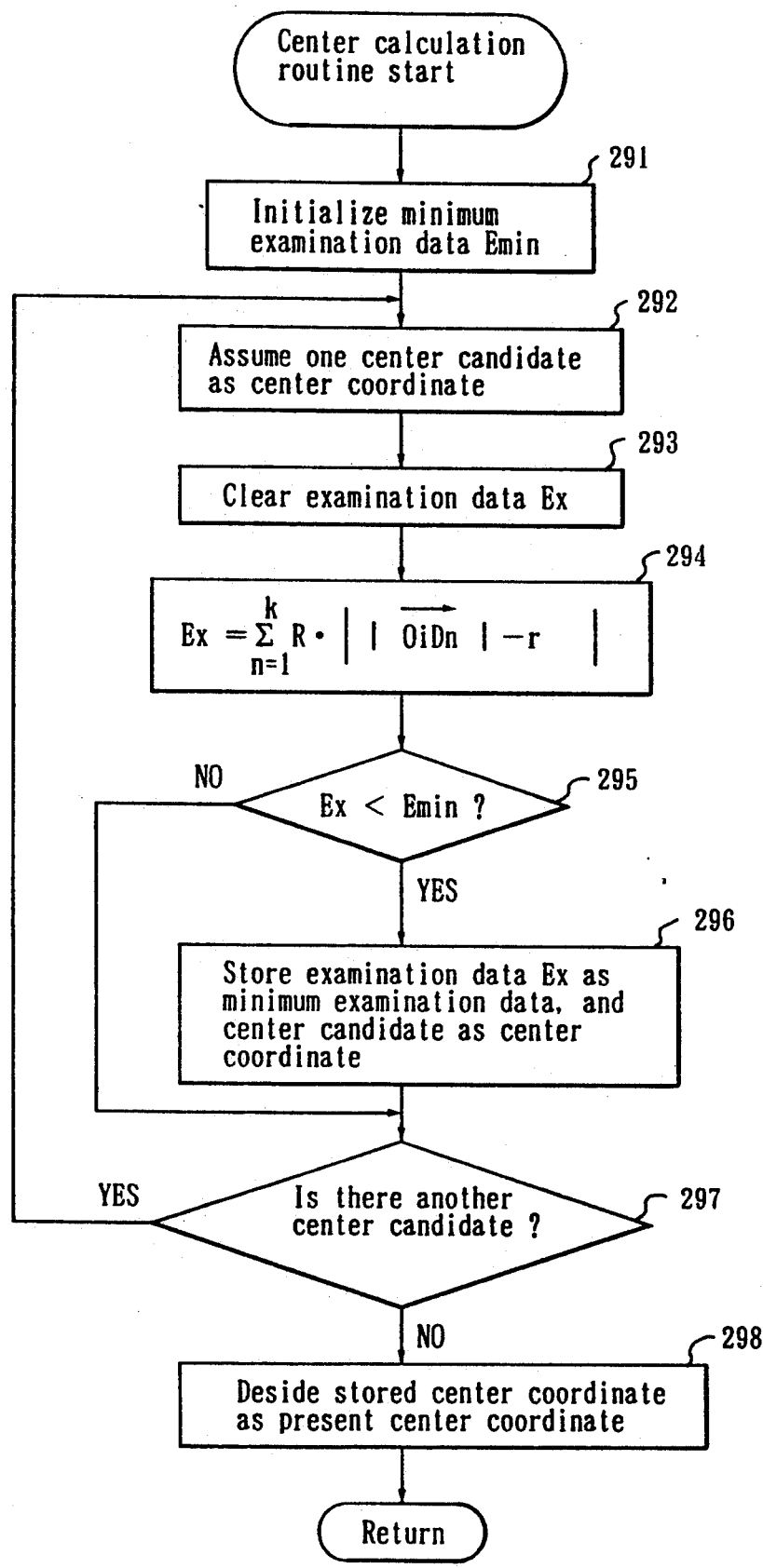
FIG. 9 is a flow chart showing a center calculation routine in the embodiment.

Hereafter, the coordinate of the center of the shifted output circle due to the variation of the magnetization of the vehicle 10 is elucidated with reference to FIG. 8 and FIG. 9. FIG. 8 is a graph of the output circle Ei for obtaining an examined data Ex in the center calculation routine. FIG. 9 is a flow chart showing a center calculation routine. The intensity and direction of the magnetization of the vehicle 10 can be inferred from the computed center coordinate of the shifted output circle. In step 29, the center calculation routine is performed to obtain the intensity and direction of the magnetization of the vehicle 10. The shifted output circle may be defined by at least three coordinates on the circular locus thereof. However, most of the output data from the terrestrial magnetism sensor 1 includes errors due to the vehicle's body magnetization and localized magnetic effects. Therefore, the reliabilities of the computed coordinate data must be considered in the center calculation routine in step 29.

In the direction finding apparatus of the present invention, a radius r of the output circle is fixed at a predetermined reasonable value. This can be made because the radius r of the output circle which is detected in a regional area is approximately constant (for example, the intensities of the terrestrial magnetism are around 0.3 gauss in Japan) and the general output circle is gradually moving on the coordinate. And the direction finding apparatus of the present invention is configured that the present coordinate of the center of the shifted output circle is found by utilizing plural center candidates, such as eight center candidates $O_i$, which are located around the center coordinate O of the already obtained output circle. The eight center candidate $O_i$ for detecting the shifted output circle are located in eight directions radially from the center coordinate O of the already obtained output circle and in the same interval from the preceding center coordinate O as shown in FIG. 8. In FIG. 8, the already obtained center coordinate is shown by "O", and the provisionally calculated centers (hereinafter is referred to as center candidates) are shown by ... "$O_{i-1}$", "$O_i$", "$O_{i+1}$". ... "$D_{n-1}$", "$D_n$", "$D_{n+1}$" denote the vectors of the above-mentioned average data which are computed by the output data of the terrestrial magnetism sensor 1 during straight moving. In the center calculation routine, CPU 5 computes an examined data Ex which denotes a deviation between a length of the inferred vector of the average data and a radius r of the inferred circular locus Ei of each center candidate $O_i$. Finally, the provisional center $O_i$ which has the least deviation is selected as the new center coordinate of the present output circle.

Apart from the above-mentioned embodiment wherein the radius of the output circle is set at a constant value, a modified embodiment may be such that the radius of the output circle is decided by the memory data when the vehicle has been turned at least one turn on the ground.

Still another modified embodiment may be such that the radius of the output circle is decided by the intensity of the horizontal component of the terrestrial magnetism data which is stored as a map data etc. in the regional area. The interval or difference between the center candidate $O_i$ and the already obtained center coordinate O is determined depending on accuracy of the calculation of the center position in this apparatus. For example, the interval is preferably set at 10 percent of the radius of the output circle. If the interval is set much smaller than 10 percent (e.g. 2 percent) of the radius of the output circle, the computation of the center coordinate of the output circle would take very long time, thereby making delay from the actual moving of the present output circle owing to a long operation time. On the contrary, if the interval is set much larger than 10 percent (e.g. 50 percent) of the radius of the output circle, the computed center coordinate of the output circle would have a large error in the terrestrial magnetism direction. Therefore, much deviation of the interval from the 10 percent results in considerable error of the computed magnetization.

Acceptable range of the interval is from 5 percent to 20 percent, so that the error of the obtained magnetization does not results a fatal error in direction finding.

FIG. 9 is a flow chart showing the center calculation routine of the correction process in the direction finding apparatus. Hereafter, the center calculation routine is elucidated with reference to the flow chart shown in FIG. 9.

In step 291, a smallest examined data Emin to be utilized in the center calculation routine is initialized to a predetermined start value. Since the minimum examined data Emin is the minimum value of the evaluated value, the predetermined start value is decided as a sufficiently large value than the examined data Ex which is actually computed in the center calculation routine. Then, in step 292, one center candidate $O_i$ among the eight provisional center candidates is chosen as a center of the inferred output circle Ei. In step 293, the preceding examined data Ex to a center candidate $O_{i-1}$ is initialized to "0", and the step goes to step 294.

An examined data calculation process for computing the examined data Ex is performed in step 294. In the FIG. 8 showing the inferred output circle Ei, the absolute value of the deviation, which is the difference between the radius r of the inferred output circle $E_i$ and the length $|\vec{O_i D_n/}|$ of the vector of the average data $D_n$ around the center candidate $O_i$, is computed for obtaining the examined data Ex. The examined data Ex on the center candidate $O_i$ is given by the following equation;

$$Ex = \sum_{n=1}^{k} R_n \cdot \left| |\overrightarrow{O_i D_n}| - r \right|, \quad (4)$$

where k is the number of the above-mentioned average data, that is eight (8) in the embodiment, Rn is the above-mentioned final reliability data of the average data. Therefore, the examined data Ex on the center candidate $O_i$ is calculated by adding the absolute deviations which are multiplied by the final reliability data Rn.

In step 295 of FIG. 9, it is examined and found whether the calculated examined data Ex is smaller than the stored minimum examined data Emin of the already obtained center coordinate O or not. When the calculated examined data Ex is smaller than the stored minimum examined data Emin, the calculated examined data Ex is stored in the memory unit 6 as a new minimum examined data Emin in step 296. At the same time, the coordinate of this center candidate $O_i$ is also stored in the memory unit 6, and the flow goes to step 297.

CPU 5 in step 297 judges whether any other center candidate exists or not. When CPU 5 judges "yes", it returns to step 292 and repeat from the above-mentioned step 292 to step 297 for another center candidate.

When CPU 5 in step 297 judges that a center candidate which should be examined by the above-mentioned examined process does not exist, any more, when all the center candidates have been examined in the center calculation routine, it goes to step 298. In step 298, CPU 5 selects the center coordinate having the smallest examined data Emin which is obtained in step 296, and decides a new center coordinate. When the above-mentioned center calculation routine (step 29 of FIG. 3) have been finished, the correction process for the magnetization of the vehicle is finished, and it returns to step 22.

Figure 10:
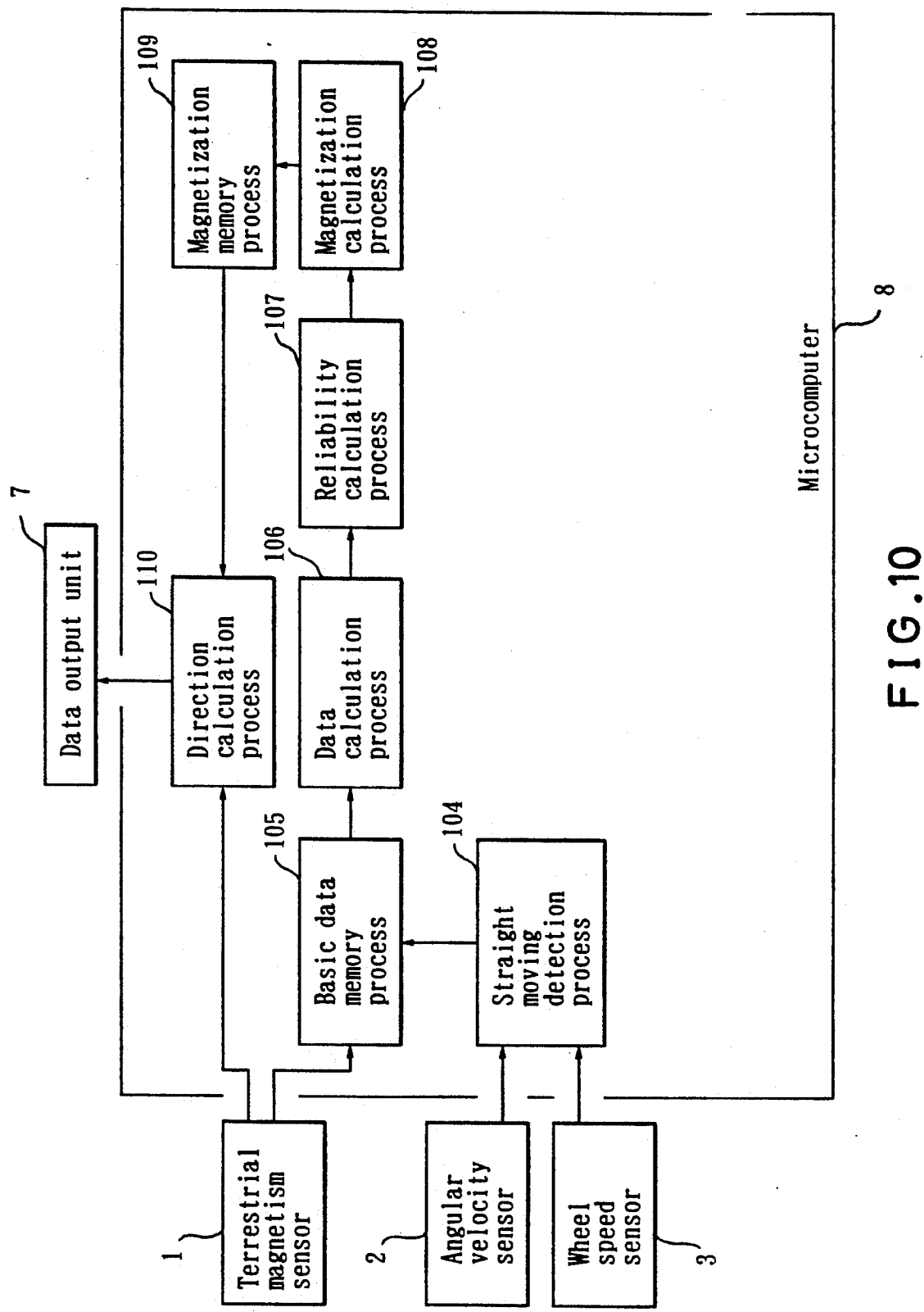
FIG. 10 is a block diagram of the embodiment shown in FIG. 1.

FIG. 10 is a block diagram showing the sequence of the embodiment of the direction finding apparatus in accordance with the present invention. In FIG. 10, a straight moving detection process 104 detects the straight moving state of the vehicle 10 by utilizing the output data of the angular velocity sensor 2 and the wheel speed sensor 3. A basic data memory process 105 stores the output data of the terrestrial magnetism sensor 1 when the straight moving state of the vehicle 10 is detected. The straight moving detection process 104 and the basic data memory process 105 are performed in step 22 of FIG. 3. A data calculation process 106 calculates the average data $\bar{x}$, $\bar{y}$ and variance data $\sigma$ by utilizing the stored output data of the basic data memory process 105 in step 24 and 25. A reliability calculation process 107 determines a reliability from the variance data $\sigma$ and the order number in step 28. A magnetization calculation process 108 computes the intensity and the direction of the magnetization of the vehicle 10 by utilizing the average data $\bar{x}$, $\bar{y}$ and the final reliability data Rn. A magnetization memory process 109 stores the magnetization of the vehicle 10. A direction calculation process 110 computes a course of the vehicle 10 from the output data of the terrestrial magnetism sensor 1 and the magnetization memory process 109. The magnetization calculation process 108, the magnetization memory process 109, and the direction calculation process 110 are performed in the center calculation routine of step 29.

Since the direction finding apparatus in accordance with the present invention utilizes the average data $\bar{x}$, $\bar{y}$ of the plural output data from the terrestrial magnetism sensor 1 during straight moving, and further takes into account the reliability of the detected data, high-precision corrections of the error due to the magnetization of the vehicle 10 and the localized magnetic effects can be executed by the direction finding apparatus having the above-mentioned magnetization correction process. And further, since the direction finding apparatus utilizes the reliability data responding to the gradual changeable intensity of the magnetization of the vehicle 10, the high-precision correction of the error for the magnetization can be obtained every time.

Figure 11:
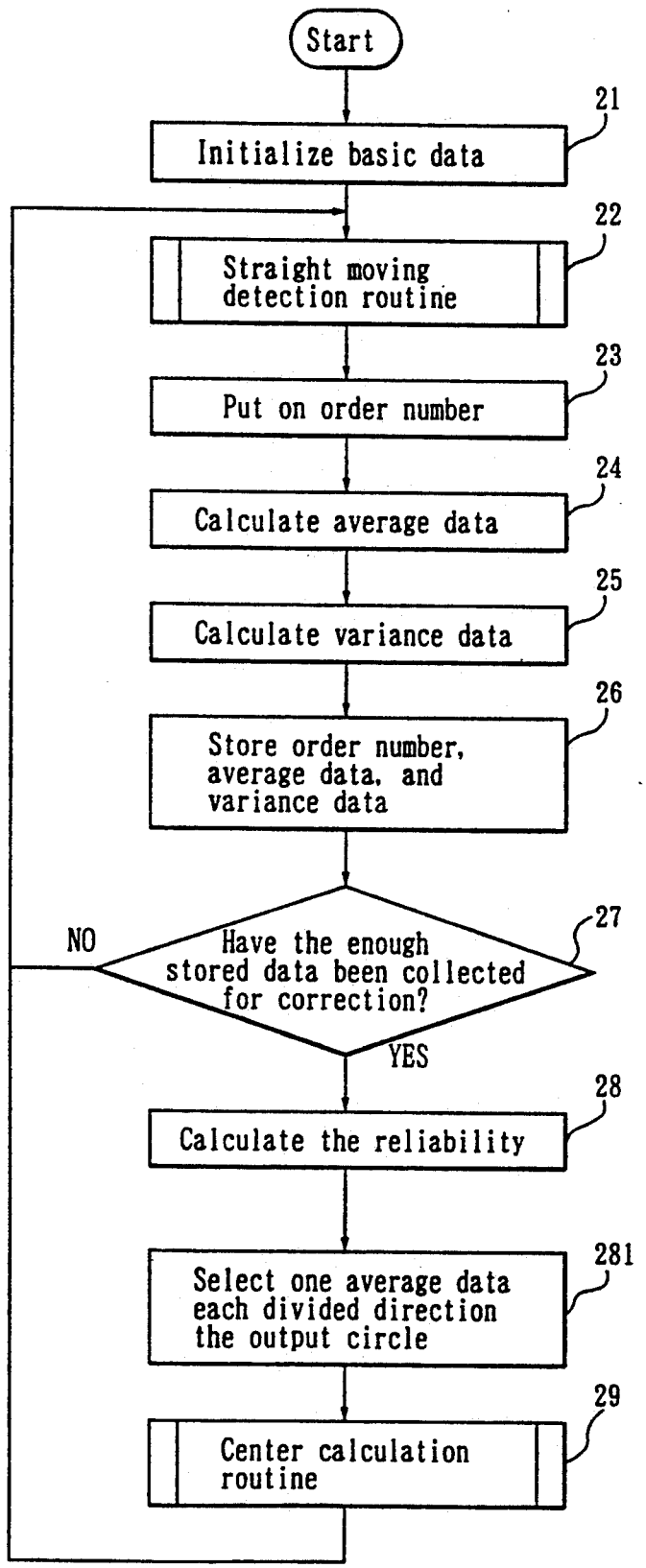
FIG. 11 is a flow chart showing a correction for a magnetization of a vehicle in another embodiment of the present invention.

Apart from the above-mentioned embodiment of the direction finding apparatus wherein the direction of the average data are not very consideration in the correction operation, another modified embodiment may be as follows. The average data having the lowest final variance data is selected in the limited direction region where the center angle of the output circle is divided into plural sectors of even predetermined angle, such as 30°. Consequently, high-precision correction for error due to the magnetization of the vehicle can be performed by utilizing the average data including high reliability. The correction operation having the above-mentioned average data selection process is effective in case that most of the average data are partial data to the output circle. FIG. 11 is a flow chart showing the correction operation having the average data selection process (step 281). As shown in FIG. 11, the average data selection process in step 281 is provided between the reliability calculation process (step 28) and the center calculation routine (step 29) shown in FIG. 3.

Apart from the above-mentioned embodiment wherein the angular velocity sensor as vehicle's direction detector is utilized in the direction finding apparatus, another modified embodiment may be such that a differential wheel speed sensor or a steering angle sensor is provided instead of the angular velocity sensor in the direction finding apparatus.

And, apart from the above-mentioned embodiment wherein the course of the vehicle is computed on the basis of the data detected by the angular velocity sensor, another modified embodiment may be such that the course of the vehicle is computed by the basis of the output data detected by the terrestrial magnetism sensor. In the above-mentioned embodiment, the reliability of the memory data is decided by utilizing the variance data and the order number.

In another modified embodiment of the direction finding apparatus, reliability of the memory data may be decided by the interval length during straight moving or the quantity of the average data. And, the final reliability data of the memory data can be decided by calculating each reliability of the variance data, the order number, the interval length, and the quantity of the average data.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for correcting magnetization of a vehicle comprising the steps of:

detecting terrestrial magnetism in a moving vehicle by terrestrial magnetism sensor means having two sensor elements arranged orthogonally to each other and generating a plurality of corresponding output data;

detecting an angular velocity of said moving vehicle and calculating a direction change angle which is equal to or larger than a predetermined angle from said detected angular velocity;

detecting a wheel speed of said moving vehicle and calculating a straight moving distance which is equal to or larger than a predetermined distance from said detected wheel speed;

determining a straight moving state of said moving vehicle from said direction change angle and said straight moving distance;

storing said output data from said terrestrial magnetism sensor means in basic data memory means when said straight moving state of said moving vehicle is determined;

determining average data and variance data from said stored output data in said basic data memory means and storing said determined average data and variance data in data calculation means;

determining reliability data from said variance data and an order number of said output data from said terrestrial magnetism sensor means;

determining an intensity and a direction of a magnetization of said moving vehicle from said average data, said variance data and said reliability data with magnetization calculation means by setting a plurality of center candidates and selecting a center coordinate from said plurality of center candidates having the smallest sum total, said sum total being calculated by multiplying said reliability data by a difference between an intensity of said detected average data and a radius of an output circle of said terrestrial magnetism;

storing said intensity and said direction of said magnetization in magnetization memory means;

determining a course of said moving vehicle from said output data from said terrestrial magnetism sensor means and said intensity and direction of said magnetization stored by said magnetization memory means; and outputting to data output means a corrected direction of terrestrial magnetism.

2. A method for correcting magnetization of a vehicle in accordance with claim 1, wherein
said reliability calculation means obtains a final reliability data on the basis of a plurality of reliability data responding to said variance data and said order number of said output data.

3. A method for correcting magnetization of a vehicle in accordance with claim 1, wherein
said reliability calculation means obtains a final reliability data based on said variance data, said order number and a distance data determined according to said straight moving state in said straight moving detection means.

4. A method for correcting magnetization of a vehicle in accordance with claim 1, wherein
in said magnetization calculation means, all direction of said output circle are divided into a plurality of sectors, so that said magnetization calculation means selects an average data having the high reliability data in said divided direction and thereby computes said intensity and direction of said magnetization of said moving vehicle.

5. A direction finding apparatus comprising:
terrestrial magnetism sensor means, having two sensor elements arranged orthogonally to each other, for detecting terrestrial magnetism from locations passed by a moving vehicle and for generating a plurality of corresponding output data;

turn rate sensor means for detecting an angular velocity of said moving vehicle and calculating a direction change angle which is equal to or larger than a predetermined angle from said detected angular velocity;

wheel speed sensor means for detecting a wheel speed of said moving vehicle and calculating a straight moving distance which is equal to or larger than a predetermined distance from said detected wheel speed;

straight moving detection means for determining a straight moving state of said moving vehicle from said direction change angle and said straight moving distance;

basic data memory means for storing said output data from said terrestrial magnetism sensor means when said straight moving state of said moving vehicle is determined by said straight moving detection means;

data calculation means for calculating average data and variance data from said stored output data of said basic data memory means and for storing said calculated average data and variance data;

reliability calculation means for determining a reliability data from said variance data and an order number of said output data of said terrestrial magnetism sensor means;

magnetization calculation means for determining an intensity and a direction of a magnetization of said moving vehicle from said average data, said variance data and said reliability data by setting a plurality of center candidates, and selecting a center coordinate from said center candidates having the smallest sum total, said sum total being calculated by multiplying said reliability data by a difference between an intensity of said detected average data and a radius of an output circle of said terrestrial magnetism;

magnetization memory means for storing said intensity and direction of said magnetization determined by said magnetization calculation means;

direction calculation means for determining a course of said moving vehicle from said output data of said terrestrial magnetism sensor means and said intensity and direction of said magnetization stored by said magnetization memory means; and data output means for outputting a corrected direction of terrestrial magnetism computed by said direction calculation means.

6. A direction finding apparatus in accordance with claim 5, wherein
said reliability calculation means obtains a final reliability data on the basis of a plurality of reliability data corresponding to said variance data and said order number of said output data.

7. A direction finding apparatus in accordance with claim 5, wherein
said reliability calculation means obtains a final reliability data based on said variance data, said order number and a distance data determined according to said straight moving state in said straight moving detection means.

8. A direction finding apparatus in accordance with claim 5, wherein
in said magnetization calculation means, all direction of said output circle are divided into a plurality of sectors, so that said magnetization calculation means selects an average data having high reliability in said divided direction and thereby computes said intensity and said direction of the magnetization of said vehicle.

* * * * *